United States Patent
Fechting et al.

(10) Patent No.: US 11,101,704 B2
(45) Date of Patent: Aug. 24, 2021

(54) FOREIGN OBJECT DETECTOR, FOREIGN OBJECT DETECTION SYSTEM, USE OF A FOREIGN OBJECT DETECTOR, AND METHOD OF DETECTING A FOREIGN OBJECT

(71) Applicant: TDK Electronics AG, Munich (DE)

(72) Inventors: Pierre Fechting, Solothurn (CH); Abiezer Tejeda, Solothurn (CH)

(73) Assignee: TDK ELECTRONICS AG, Munich (DE)

( * ) Notice: Subject to any disclaimer, the term of this patent is extended or adjusted under 35 U.S.C. 154(b) by 4 days.

(21) Appl. No.: 16/614,758

(22) PCT Filed: May 23, 2017

(86) PCT No.: PCT/EP2017/062453
§ 371 (c)(1),
(2) Date: Nov. 18, 2019

(87) PCT Pub. No.: WO2018/215060
PCT Pub. Date: Nov. 29, 2018

(65) Prior Publication Data
US 2020/0212724 A1  Jul. 2, 2020

(51) Int. Cl.
*H02J 50/60* (2016.01)
*H02J 50/12* (2016.01)
*G01V 3/10* (2006.01)

(52) U.S. Cl.
CPC ............. *H02J 50/60* (2016.02); *G01V 3/102* (2013.01); *H02J 50/12* (2016.02)

(58) Field of Classification Search
CPC .......... H02J 50/60; H02J 50/12; G01V 3/102; G01V 3/104
See application file for complete search history.

(56) References Cited

U.S. PATENT DOCUMENTS 9,203,244 B2   12/2015  Abe
10,254,427 B2   4/2019  Adachi
(Continued)

FOREIGN PATENT DOCUMENTS

GB    2512864 A    10/2014
JP    2008203240 A   9/2008
(Continued)

OTHER PUBLICATIONS

G. C. Jang, S. Y. Jeong, H. G. Kwak and C. T. Rim, "Metal object detection circuit with non-overlapped coils for wireless EV chargers," 2016 IEEE 2nd Annual Southern Power Electronics Conference (SPEC), Auckland, 2016, pp. 1-6 (Year: 2016).*

*Primary Examiner* — Daniel R Miller
(74) *Attorney, Agent, or Firm* — Slater Matsil, LLP

(57) ABSTRACT

A foreign object detector, a foreign object detection system and a method for operating the foreign object detector are disclosed. In an embodiment, a foreign object detector includes a conducting wire with a first section and a second section, a first node, a second node and an intermediate node, wherein the first section electrically connects the first node to the intermediate node and has a plurality of three or more vertical segments, and wherein the second section electrically connects the intermediate node to the second node and has a plurality of three or more horizontal segments.

20 Claims, 6 Drawing Sheets

(56) References Cited

U.S. PATENT DOCUMENTS

| | | |
|---|---|---|
| 2013/0069441 A1 | 3/2013 | Verghese et al. |
| 2014/0111019 A1* | 4/2014 | Roy .................. H01F 38/14 |
| | | 307/104 |
| 2015/0022014 A1 | 1/2015 | Tanabe |
| 2015/0276965 A1 | 10/2015 | Turki |
| 2016/0006260 A1* | 1/2016 | Nakamura ............ B60L 53/126 |
| | | 307/104 |
| 2016/0238731 A1 | 8/2016 | Chopra et al. |
| 2017/0005524 A1 | 1/2017 | Akuzawa et al. |
| 2017/0117756 A1 | 4/2017 | Muratov |
| 2017/0248726 A1* | 8/2017 | Adachi .................. H01F 27/28 |

FOREIGN PATENT DOCUMENTS

| | | |
|---|---|---|
| JP | 2011211874 A | 10/2011 |
| JP | 2016082848 A | 5/2016 |
| JP | 2016536951 A | 11/2016 |
| WO | 2015097809 A1 | 7/2015 |
| WO | 2016031209 A1 | 3/2016 |

* cited by examiner

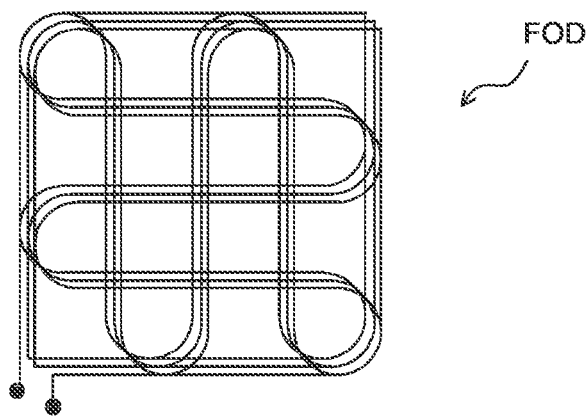
Fig. 7
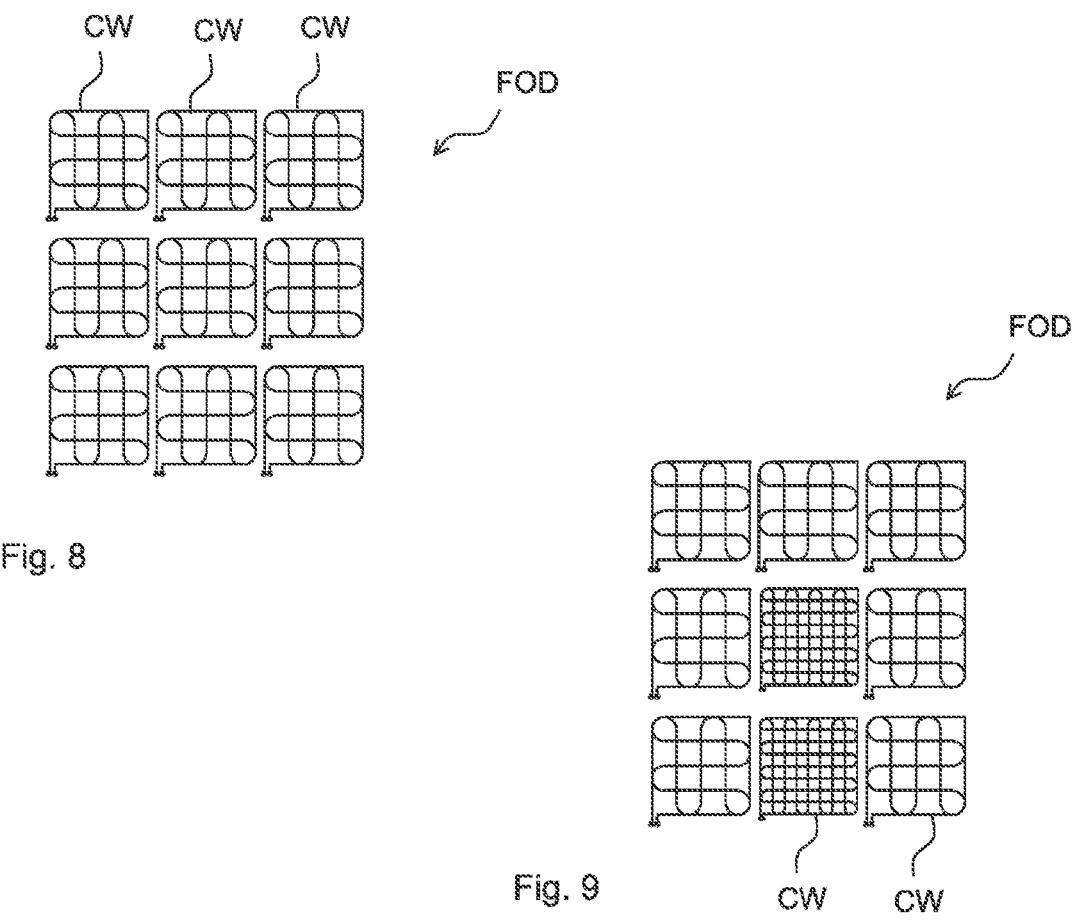
Fig. 8
Fig. 9

FOREIGN OBJECT DETECTOR, FOREIGN OBJECT DETECTION SYSTEM, USE OF A FOREIGN OBJECT DETECTOR, AND METHOD OF DETECTING A FOREIGN OBJECT

This patent application is a national phase filing under section 371 of PCT/EP2017/062453, filed May 23, 2017, which is incorporated herein by reference in its entirety.

TECHNICAL FIELD

The present invention refers to the field of foreign object detection, e.g., for wireless power transfer systems.

BACKGROUND

Wireless power transfer systems can be used to transfer electric power from a primary coil to a secondary coil without the need for direct physical contact between the coils. Wireless power transfer systems can be used to transfer power from a charging base coil to a secondary coil to charge or power an electric load, e.g., a battery.

When high power transfer rates are needed strong magnetic fields are generated from the primary coil to the secondary coil. Metallic or dielectric objects in the vicinity can absorb energy in the form of heat. In particular, metallic objects and dielectric objects such as living matter can be heated up.

Thus, the necessity for monitoring the vicinity of the wireless power transmission, especially during operation and before initiating a power transfer operation is needed.

From U.S. Patent Publication No. 2013/0069441A1, a system for monitoring utilizing coils is known.

Other solutions are based on switching inductive sensors to monitor the wireless power transmission system's environment.

Known solutions do not cover the complete area. Some known solutions are not able to detect living matter. Some known solutions are susceptible to noise, especially when strong magnetic fields are present. Such systems require complex noise filtering and are disturbed and disturb the wireless power transmission system.

SUMMARY OF THE INVENTION

Embodiments provide a foreign object detection that is immune to electromagnetic signals. Further embodiments provide a detector that is able to sense the proximity of metallic objects and living matter. Yet other embodiments provide a detector that is compatible with strong magnetic fields such as the magnetic fields of a wireless power transmission system. Various further embodiments provide a detector that does not disturb a power transfer process or vice versa. Various other embodiments provide a detector that provides a clear signal with a minimum of induced noise and that is compatible with a plurality of different sizes and shapes of areas that need monitoring.

Additional embodiments provide a use of a foreign object detector and a method of detecting a foreign metallic or dielectric object.

In various embodiments, the foreign object detector comprises a conducting wire with a first section and a second section. Further, the foreign object detector has a first node, a second node and an intermediate node. The first section electrically connects the first node to the intermediate node and has plurality of three or more vertical segments. The second section electrically connects the intermediate node to the second node and has a plurality of three or more horizontal segments.

The second node can be arranged in the vicinity of the first node.

Such a conducting wire can preferably be used to cover a rectangular area. However, where a not-flat surface can locally be approximated by patches of flat surfaces, the principles of the present foreign object detector can be utilized to cover non-flat surfaces also.

The wording horizontal and vertical indicates the orientation of the corresponding sections relative to each other. The orientation of the whole foreign object detector is not limited.

It is preferred that the first node and the second node are arranged in a distance as small as possible. The plurality of horizontal segments and the plurality of vertical segments establish a mesh structure with mesh elements, e.g., rectangular or rhomboid mesh elements. If the size of the mesh elements is sufficiently small compared to the absolute value of a gradient of a present magnetic field, then contributions of the magnetic field to a signal from the different mesh elements cancel each other and the overall signal of the foreign object detector is mainly independent of a present magnetic field. Thus, the present foreign object detector is immune to external magnetic fields and to a changing magnetic field.

The first node and the second node on one hand and the intermediate node on the other hand are mainly arranged diagonally with respect to a rectangle.

It is possible that the node is a hardware node or that the node is a virtual node of an equivalent circuit diagram. Then, the first section and the second section are parts of a single conductor.

It is possible that the number of the vertical segments of the first section and the number of the horizontal segments of the second section are odd numbers.

However, it is also possible that the number of the vertical segments of the first section and the number of the horizontal segments of the second section are even numbers.

The number of the vertical segments and the number of the horizontal segments can be equal. However, the number of the vertical segments and the number of the horizontal segments can be different.

Further, it is possible that the vertical segments of the first section and the horizontal segments of the second section are arranged in a meander pattern.

Then, the conducting wire having the first section and the second section establishes a mesh with mesh elements and metallic objects, dielectric objects and living matter in the vicinity of such a mesh can be detected by evaluating the electric behavior of the conducting wire.

It is possible that the wire further comprises turning segments between the vertical segments and between the horizontal segments. The turning segments may have the shape of a circle segment (e.g., the shape of a half-circle), the shape of two 90° turn or the shape of four 45° turns. The winding number of such a turning segment may be 0.5.

It is possible that the first section and the second section establish at intersection points rhomboid mesh elements. Thus, deviation from 90° intersections between the first section and the second section of the conducting wire are possible.

It is accordingly possible that the wire establishes a mesh that has the shape of a rectangle, of a section of a lateral surface of a cylinder, or of a section of a lateral surface of a cone.

One such mesh or a plurality of corresponding meshes can be utilized to cover the sensitive area of a primary part of a wireless power transmission system or of a secondary part of a wireless power transmission system.

To that end, the foreign object detector can further comprise one or more additional conducting wires where each of the additional conducting wire establishes an additional mesh.

It is further possible that the foreign object detector comprises a driver circuit. The conducting wire or the plurality of conducting wires establishes a single or a plurality of impedance elements. The driver circuit is provided to excite the one impedance element or the plurality of impedance elements with or without a resonance.

A possible resonance frequency of the resonance circuit comprising the conducting wire and the driver circuit can be in a range of Kilohertz and Gigahertz, e.g., between 100 kHz and 100 GHz.

Further, it is possible that one or more driver circuits are provided where the resonance frequency changes between a lower resonance frequency in the range of a few hundred kilohertz and a higher resonance frequency around several GHz.

Depending on the excitation frequency the circuit can show an inductive and a capacitive behavior.

It was found that the above described wiring topology of the conductive wire allows the detection of metallic objects or the presence of dielectric matter.

It is also possible to drive the conducting wire as an impedance element in an intermediate frequency range between 100 kHz and 15 MHz. Then, the conducting wire shows properties of an inductive sensing element and a capacitive sensing element and the environment of the foreign object detector can be searched for both metallic and dielectric objects.

It is possible that the foreign object detector further comprises an evaluation circuit. The evaluation circuit is provided to detect a change of a parameter of the conducting wire. A parameter could be selected from the impedance of the conducting wire, the amplitude of a signal, the resonance frequency of a signal and the change of a frequency.

The signal can be the signal of a driver circuit that is utilized to excite the conducting wire.

It is possible that the evaluation circuit can distinguish between metallic and dielectric matter in the vicinity of the conducting wire.

Such a foreign object detector can be used to detect foreign metallic or dielectric matter in the vicinity of the wireless power transmission (WPT) system.

It is possible to use the foreign object detector before, during and/or after operation of the WPT system.

Further embodiments provide a method of detecting a foreign metallic or dielectric object using the above described foreign object detector can comprise the steps:
exciting the conducting wire with an AC signal (AC=alternative current),
monitoring a parameter selected from the impedance of the conducting wire, the amplitude of the AC signal and the resonance frequency of the AC signal,
detecting a change of the monitored parameter.

Accordingly, it is possible that a capacitive behavior of the conducting wire indicates the presence of a dielectric object and an inductive behavior of the conducting wire indicates the presence of a metallic object.

It is possible to integrate the foreign object detector in a foreign object detection system. The foreign object detection system may comprise further parts and components in addition to the foreign object detector.

The foreign object detector is based on embodiments according to the above described possibilities of a wiring topology. These topology possibilities allow an immunity to external electromagnetic fields while a complete area around a primary or a secondary coil of a WPT system can be covered.

The size of the mesh and the size of the mesh's elements can be chosen such that a coupling of mainly zero with an external electromagnetic field is obtained. This can be obtained if the size of the mesh elements is sufficiently small compared to a scale of inhomogeneity of the magnetic field. Thus, practically no noise will be present in the signal applied to the evaluation circuit and the foreign object detector does not affect the operation of the surrounding circuit elements, e.g., of the wireless power transmission system. As a consequence thereof, the foreign object detector will not be heated up during the operation of the WPT system.

The power needed to drive the conducting wire can be as low as a few mW. The sensitivity of the foreign object detector can be selected by choosing the power of the AC signal that is used to drive the conducting wire. Further, it is possible to cover one patch, e.g., a rectangular patch by two of the described conducting wires which are electrically connected in series or in parallel with or without resonating components.

The size of a patch having one mesh or the size of one element of the mesh can be within a very large range, in principle from nanometers to kilometers. Preferred sizes for one patch can be in the range of 10×10 cm. A preferred size of a mesh element can be in the range between $1 \times 1$ mm$^2$ and $1 \times 1$ cm$^2$.

A preferred number of elements of a mesh can be between 2×2 (in the case of three horizontal segments and three vertical segments) and 20×20 (for 21 horizontal segments and 21 vertical segments).

The conducting wire for one mesh or a plurality of conducting wires for a plurality of meshes can be mounted on a solid or a flexible PCB (Printed Circuit Board). The wire can also be embedded in the cover of a ground assembly of a power transfer system.

The conducting wire, the driver circuit and the evaluation circuit can be galvanically isolated from the circuit of a primary coil and the circuit of a secondary coil of a WPT system.

It is possible that a patch has a size of approximately 1×1 m. The mesh elements can have a size of 1.5×1.5 cm. The driver circuit can apply a signal with an amplitude of 11 V to the conducting wire of the mesh. Then, the presence of a human hand in the vicinity of the mesh can be observed as a relatively large amplitude drop from 11 V to 9.52 V. In parallel, a frequency change of 60 kHz (from 14.98 MHz to 15.04 MHz) can also be observed.

BRIEF DESCRIPTION OF THE DRAWINGS

Working principles and details of preferred embodiments are described in the schematic accompanying figures.

In the figures.

FIG. 7 illustrates three meshes covering the same patch to increase sensitivity.

FIG. 8 shows a possibility of arranging nine conducting wires in a matrix arrangement.

FIG. 9 shows the possibility of combining patches of the same size but with meshes of different element sizes.

DETAILED DESCRIPTION OF ILLUSTRATIVE EMBODIMENTS

Figure 1:
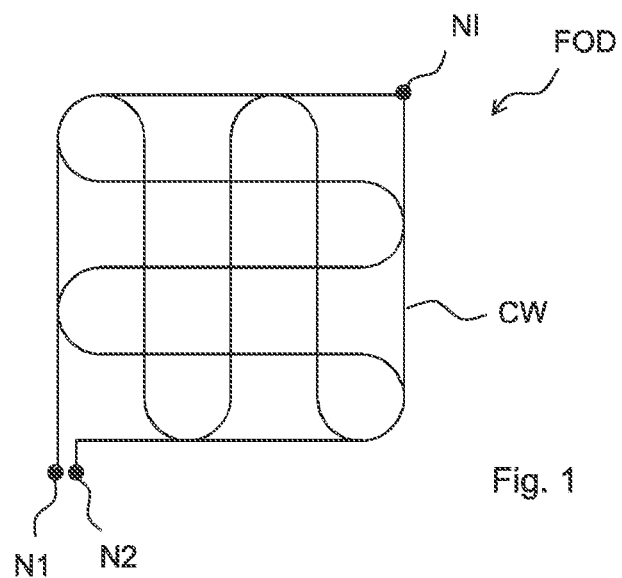
FIG. 1 shows a possible topology of the conducting wire.

FIG. 1 shows a possible arrangement of a conducting wire CW of a foreign object detector FOD. The foreign object detector FOD has a first node N1 and a second node N2. The conducting wire has a first segment that electrically connects the first node N1 to an intermediate node NI. A second section electrically connects the intermediate node NI to the second node N2. It is preferred that the second node is arranged in the vicinity of the first node N1. Then, a matrix arrangement of n×m mesh elements is obtained. The shape of the patch covered by the mesh can be essentially rectangular. The first node N1 and the second node N2 on one hand and the intermediate node NI on the other hand are arranged on diagonal edges of the rectangular. It is possible that the number of columns n and the number of lines m of the mesh are even numbers. Then, the number of vertical segments is n+1 and the number of horizontal segments is m+1.

Figure 2:
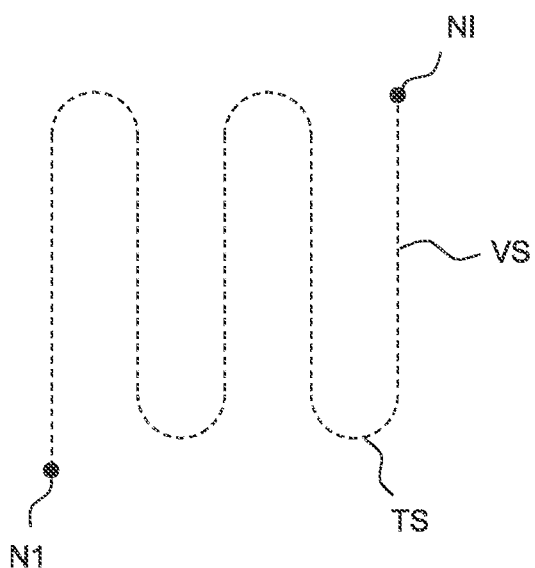
FIG. 2 shows a possible topology of the first section of the conducting wire.

FIG. 2 illustrates a possible shape of the first section of the conducting wire CW. The first section has vertical segments VS that are electrically connected to each other via turning segments TS.

Figure 3:
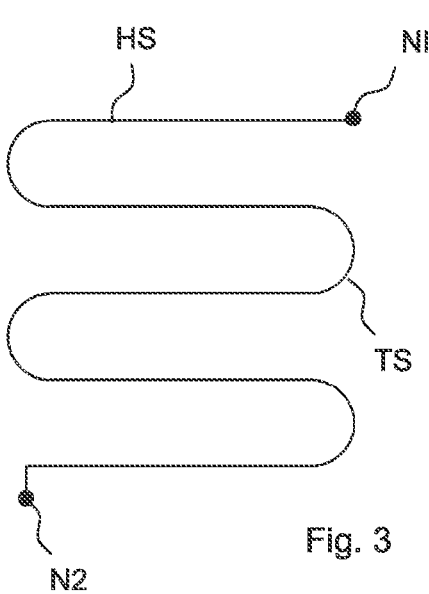
FIG. 3 shows a possible embodiment of the second section of the conducting wire.

FIG. 3 shows the corresponding second section of the conducting wire CW. The second section has horizontal segments HS which are electrically interconnected by turning segments TS.

The first section of the conducting wire as shown in FIG. 2 and the second section of the conducting wire as shown in FIG. 3 are arranged one above the other and connected to each other by the intermediate node NI such that the second node N2 comes to a position near the position of the first node N1. Then, the mesh structure of FIG. 1 is obtained.

Figure 4:
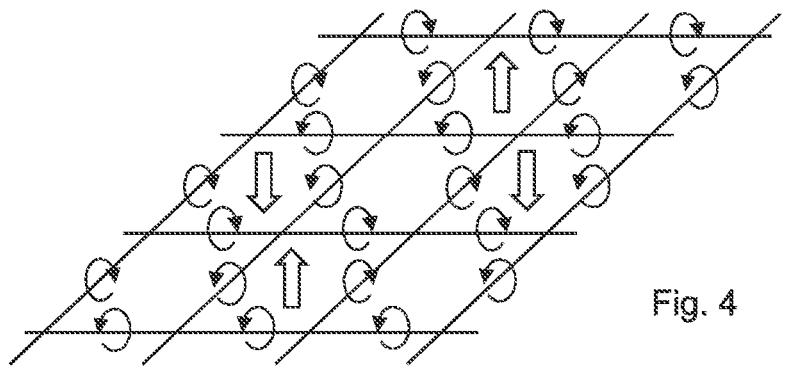
FIG. 4 illustrates the working principle and an explanation of the detector being immune to external magnetic fields.

FIG. 4 shows the working principle and the interaction to an external magnetic field.

If an AC signal or an RF signal is applied to the port comprising the first node N1 and the second node N2, then FIG. 4 shows (circular arrows) the orientation of an induced magnetic field for each of the 3×3 mesh elements. There are mesh elements (without an arrow) where the contributions to the overall magnetic field of the singular wire elements of a mesh element cancel each other out. Further, there are mesh elements (indicated with arrows up or down) where all four contributions to the overall magnetic field of a mesh element add up. Per one mesh element with a magnetic field in the upwards direction, there is one mesh element with a magnetic field in the downward direction. Thus, the total interaction due to induction cost by an external magnetic field is zero. However, if a metallic object or a dielectric object is brought near to the patch, then locally an impedance of the patch is changed and a change in a parameter of the AC or RF signal applied to the port can be monitored.

Figure 5:
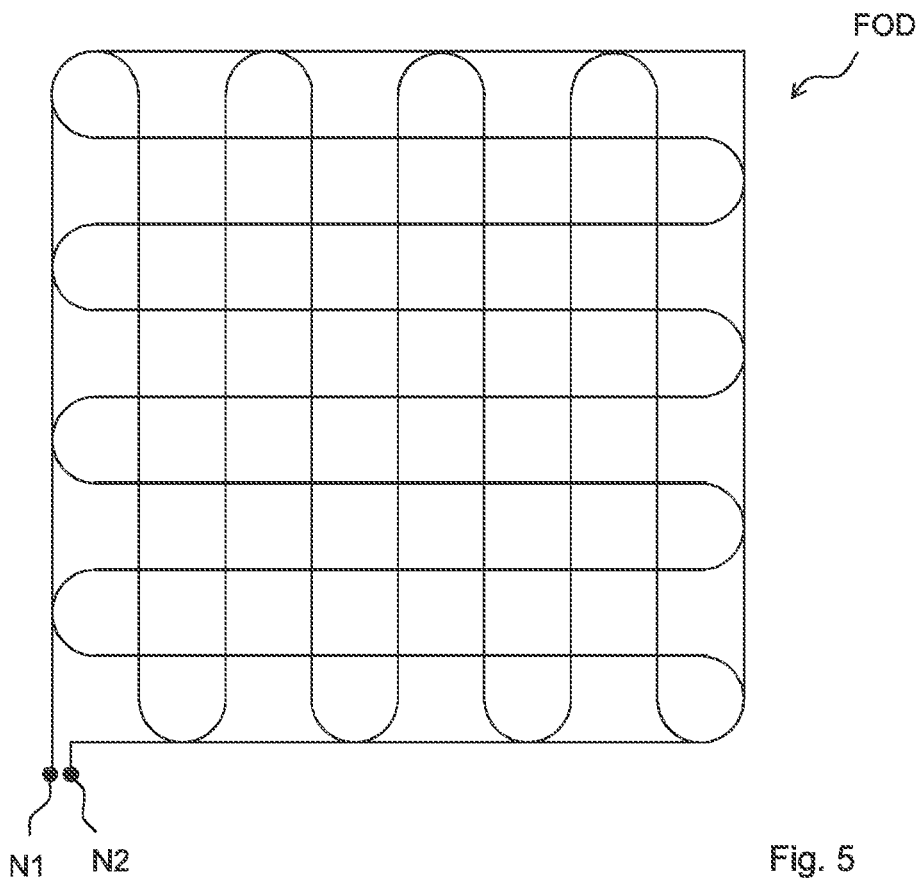
FIG. 5 shows an embodiment with 8×8 elements.

FIG. 5 shows the possibility of increasing the size of a mesh element to obtain a larger patch.

Figure 6:
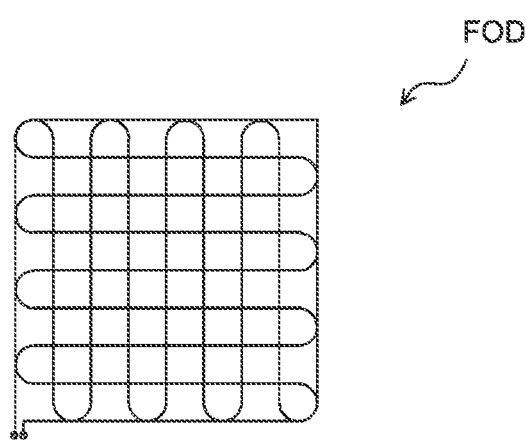
FIG. 6 shows an embodiment with a smaller area of one patch.

FIG. 6 shows the possibility of reducing the size of a mesh element to obtain a reduced patch.

The size of the patch can be chosen according to the size of an area to be covered. The size of the corresponding mesh elements can be chosen according to the homogeneity of a magnetic field.

FIG. 7 shows the possibility of arranging three meshes within a single patch and electrically connecting the meshes' wires in series.

FIG. 8 shows the possibility of arranging a plurality of meshes in a plurality of patches one next to another in a matrix arrangement to cover a larger area. The conducting wires of the meshes can be electrically connected in series or in parallel or an own dedicated driver circuit and evaluation circuit can be provided to each of the meshes.

FIG. 9 illustrates the possibility of arranging patches of the same size but having different meshes with different mesh element sizes.

Figure 10:
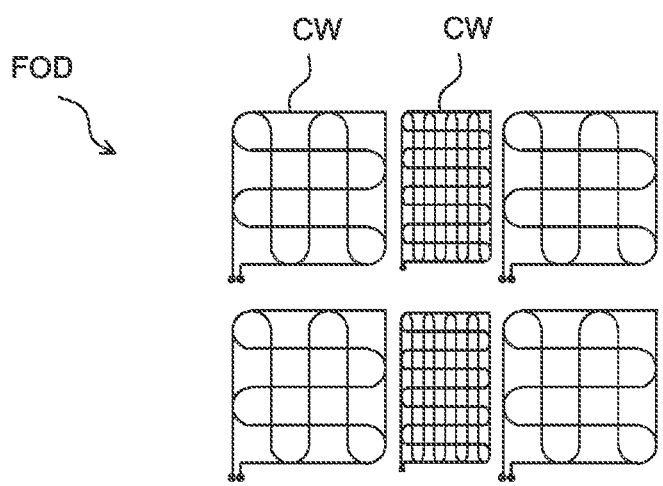
FIG. 10 shows quadratic patches combined with rectangular patches.

FIG. 10 illustrates the possibility of providing meshes and patches that are not limited to quadratic shapes. Quadratic patches and rectangular patches can be combined.

Figure 11:
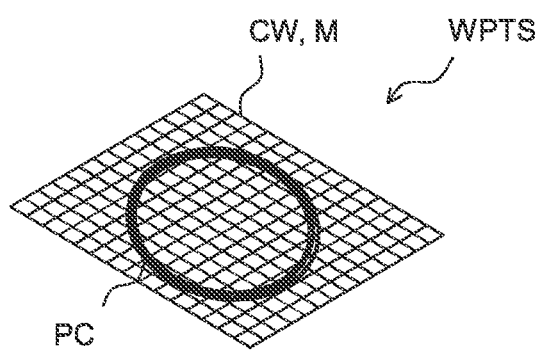
FIG. 11 shows the possibility of arranging a rectangular foreign object detector in a plain above a primary coil of a WPT system.

FIG. 11 shows a possible arrangement of a conducting wire CW establishing a mesh M over a primary coil PC of a wireless power transmission system WPT. Before powering up the wireless power transmission systems and during operation of the wireless power transmission system, the mesh of the foreign object detector can be utilized to check whether the vicinity of the wireless power transmission system is free of unwanted metallic and/or dielectric matter.

Figure 12:
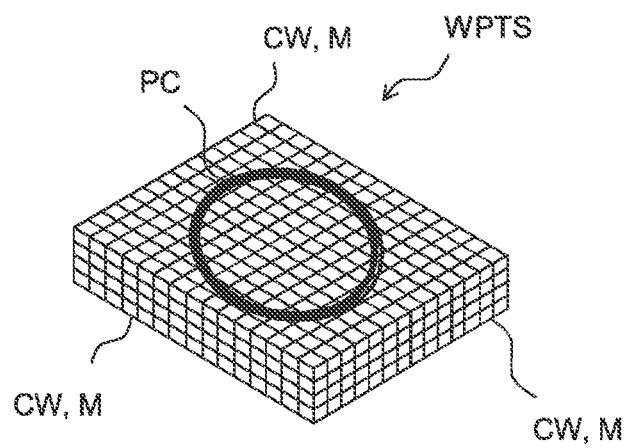
FIG. 12 shows the possibility of adding further patches to cover further areas around a primary coil.

FIG. 12 illustrates the possibility of adding further meshes M around the primary coil PC. The meshes of the foreign object detector can be arranged at the positions of site surfaces, e.g., front and back, left and right, and topside of a cuboid around a primary coil PC of the wireless power transmission WPTS.

Figure 13:
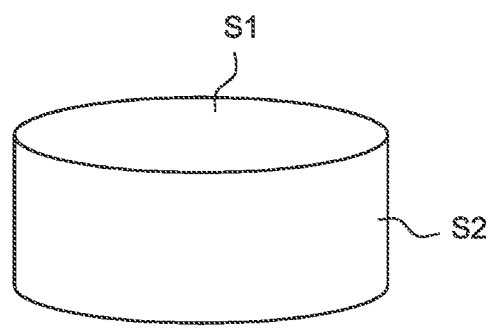
FIG. 13 illustrates the possibility of covering different topologies.

FIG. 13 illustrates the possibility of covering further surfaces that are not limited to rectangular surfaces. The top side S1 (being a disk) and the lateral surface S2 of the cylinder can also be covered with a band patch or a plurality of patches by approaching a non-rectangular shape by a plurality of small rectangular shapes.

Figure 14:
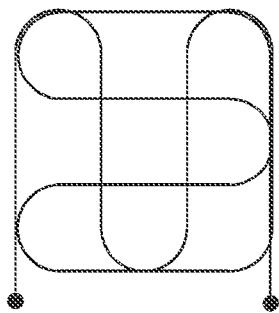
FIG. 14 illustrates the possibility of even numbers of segments.

FIG. 14 illustrates a topology with an even number of the vertical segments of the first section and an even number of the horizontal segments of the second section. The second node can be spaced apart from the first node.

Figure 15:
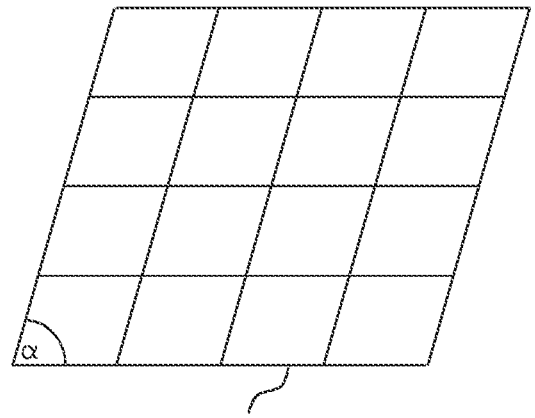
FIG. 15 illustrates the possibility of deviating from 90° angles.

FIG. 15 illustrates the possibility of rhomboid shaped mesh elements ME constituting a mesh M. Thus, a deviation of α=90° is possible. The sections of the conducting wire divide the detection in the shown example are into a grid of 4×4 mesh elements. But in principle any grid size n×m is possible with n and m being natural numbers≥2.

Figure 16:
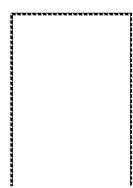
FIGS. 16-18 illustrate the different possibilities of turning segments.

FIG. 16 shows a turning segment with two 90° turns.

Figure 17:

FIG. 17 shows a turning segment with a half circle.

Figure 18:
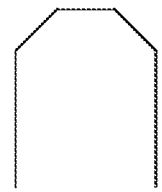

FIG. 18 shows a turning segment with four 45° turns.

Figure 19:
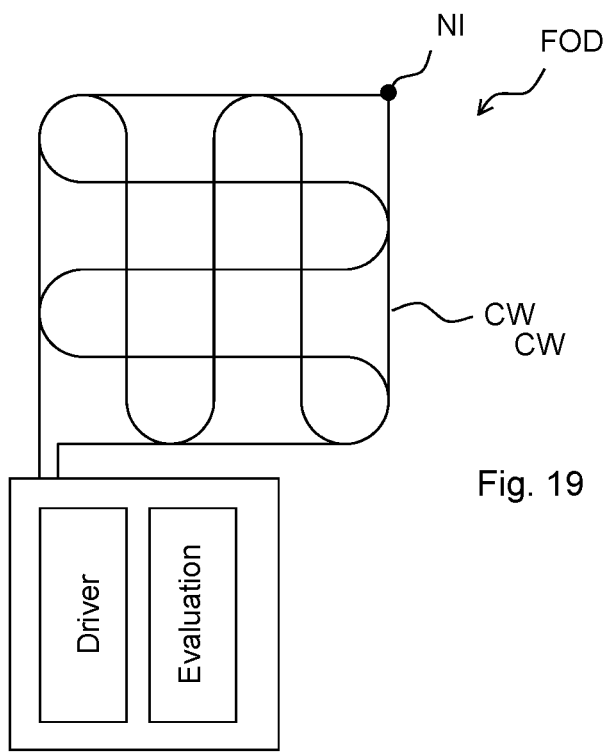
FIG. 19 shows a possible topology of the conducting wire with a driver circuit and evaluation circuit.

It is possible that the foreign object detector comprises a driver circuit. The conducting wire or the plurality of conducting wires establishes a single or a plurality of impedance elements. The driver circuit is provided to excite the one impedance element or the plurality of impedance elements with or without a resonance. It is further possible that the foreign object detector comprises an evaluation circuit. The evaluation circuit is provided to detect a change of a parameter of the conducting wire. A parameter could be selected from the impedance of the conducting wire, the amplitude of a signal, the resonance frequency of a signal and the change of a frequency. A driver circuit and an evaluation circuit in connection with a possible topology of a conducting wire are shown in FIG. 19.

The foreign object detector, the use of the foreign object detector and the method of detecting a foreign metallic or dielectric object are not limited to the above described examples. Further meshes and circuit elements and further steps can also be contained.

The invention claimed is:

1. A foreign object detector comprising:
   a conducting wire with a first section and a second section, a first node, a second node and an intermediate node,
   wherein the first section electrically connects the first node to the intermediate node and has a plurality of three or more vertical segments, and
   wherein the second section electrically connects the intermediate node to the second node and has a plurality of three or more horizontal segments;
   a driver circuit,
   wherein the conducting wire establishes an impedance element, and
   wherein the driver circuit is configured to excite the impedance element with a resonance; and
   an evaluation circuit configured to detect a change of a parameter of the conducting wire selected from an impedance of the conducting wire, an amplitude of a signal of the conducting wire or a resonance frequency of a signal of the conducting wire, the evaluation circuit further configured to detect foreign metallic or dielectric matter in the vicinity of the conducting wire based on the detected change of the parameter;
   wherein the vertical segments of the first section and the horizontal segments of the second section are arranged in respective first and second meander patterns, the second meander pattern overlaid over the first meander pattern to establish mesh elements at intersection points of the vertical and horizontal elements.

2. The foreign object detector of claim 1, wherein a number of the vertical segments of the first section and a number of the horizontal segments of the second section are odd numbers.

3. The foreign object detector of claim 1, wherein a number of the vertical segments of the first section and a number of the horizontal segments of the second section are even numbers.

4. The foreign object detector of claim 1, further comprises turning segments between the vertical segments and between the horizontal segments, wherein the turning segments have a shape of an arc of a circle, and wherein a winding number of a turning segment is 0.5.

5. The foreign object detector of claim 1, wherein the first section and the second section establish at intersection points rhomboid mesh elements.

6. The foreign object detector of claim 1, wherein the conducting wire establishes a mesh that has a shape of a rectangle.

7. The foreign object detector of claim 1, further comprising one or more additional conducting wires each of the additional wires establishing a mesh.

8. The foreign object detector of claim 1, wherein the evaluation circuit is configured to distinguish between metallic and dielectric matter in a vicinity of the conducting wire.

9. The foreign object detector of claim 1, wherein the conducting wire establishes a mesh that has a shape of a rectangle, a section of a lateral surface of a cylinder, or a section of a lateral surface of a cone, and wherein the foreign object detector further comprises one or more additional conducting wires each of the additional wires establishing a mesh.

10. The foreign object detector of claim 1, further comprises turning segments between the vertical segments and between the horizontal segments, wherein the turning segments a shape of two 90° turns, and wherein a winding number of a turning segment is 0.5.

11. The foreign object detector of claim 1, further comprises turning segments between the vertical segments and between the horizontal segments, wherein the turning segments have a shape of four 45° turns, and wherein a winding number of a turning segment is 0.5.

12. The foreign object detector of claim 1, wherein the conducting wire establishes a mesh that has a shape of a section of a lateral surface of a cylinder.

13. The foreign object detector of claim 1, wherein the conducting wire establishes a mesh that has a shape of a section of a lateral surface of a cone.

14. A detection system comprising:
   the foreign object detector according to claim 1.

15. A method for using the foreign object detector according to claim 1, the method comprising:
   detecting, by the foreign object detector, foreign metallic or dielectric matter in a vicinity of a wireless power transmission (WPT) system.

16. A method for using the foreign object detector according to claim 1, the method comprising:
   operating the foreign object detector before and/or during operation of a wireless power transmission (WPT) system.

17. A method for detecting a foreign metallic object by the foreign object detector of claim 1, the method comprising:
   exciting the conducting wire of the foreign object detector with an AC signal;
   monitoring the parameter being the impedance of the conducting wire, an amplitude of the AC signal or a resonance frequency of the AC signal; and
   detecting a change of the monitored parameter.

18. The method of claim 17, wherein an inductive behavior of the conductive wire indicates a presence of the foreign metallic object.

19. A method for detecting a foreign dielectric object by the foreign object detector of claim 1, the method comprising:
   exciting the conducting wire of the foreign object detector with an AC signal;

monitoring the parameter being the impedance of the conducting wire, an amplitude of the AC signal or a resonance frequency of the AC signal; and detecting a change of the monitored parameter.

20. The method of claim 19, wherein a capacitive behavior of the conducting wire indicates a presence of the foreign dielectric object.

* * * * *